(12) United States Patent
Yi et al.

(10) Patent No.: US 9,643,354 B2
(45) Date of Patent: May 9, 2017

(54) MOLDING APPARATUS AND BATTERY TRAY MANUFACTURED THEREBY

(71) Applicant: SAMSUNG SDI CO., LTD., Yongin-si (KR)

(72) Inventors: Jae-Ok Yi, Yongin-si (KR); Sung-Gen Ok, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/802,909

(22) Filed: Jul. 17, 2015

(65) Prior Publication Data

US 2016/0059470 A1  Mar. 3, 2016

(30) Foreign Application Priority Data

Aug. 26, 2014  (KR) .................. 10-2014-0111569

(51) Int. Cl.
| | |
|---|---|
| *B29C 51/06* | (2006.01) |
| *B29C 51/08* | (2006.01) |
| *B29C 51/10* | (2006.01) |
| *B29C 51/36* | (2006.01) |
| *H01M 2/10* | (2006.01) |
| *B29K 105/00* | (2006.01) |
| *B29L 31/00* | (2006.01) |

(52) U.S. Cl.
CPC ............ *B29C 51/082* (2013.01); *B29C 51/10* (2013.01); *B29C 51/36* (2013.01); *H01M 2/1022* (2013.01); *B29K 2105/256* (2013.01); *B29L 2031/7146* (2013.01); *H01M 2220/30* (2013.01)

(58) Field of Classification Search
CPC ....... B29C 51/082; B29C 51/10; B29C 51/36; H01M 2220/30; H01M 2/1022; B29K 2105/256; B29L 2031/7146
See application file for complete search history.

(56) References Cited

U.S. PATENT DOCUMENTS

| | | | |
|---|---|---|---|
| 2002/0074695 A1* | 6/2002 | Hong ...................... | B29C 51/30 264/322 |
| 2012/0025420 A1* | 2/2012 | Utashiro ............... | B29C 43/021 264/293 |
| 2013/0127082 A1* | 5/2013 | Wang .................... | B29C 43/021 264/45.1 |

FOREIGN PATENT DOCUMENTS

| | | |
|---|---|---|
| KR | 2009-0058179 A | 6/2009 |
| KR | 2010-0098129 A | 9/2010 |
| KR | 2013-0007945 A | 1/2013 |

* cited by examiner

*Primary Examiner* — Mark F Huff
*Assistant Examiner* — Monique Wills
(74) *Attorney, Agent, or Firm* — Knobbe Martens Olson & Bear LLP

(57) ABSTRACT

There are provided a molding apparatus and a battery tray manufactured thereby. The molding apparatus for molding a sheet that is fed along a first plane and manufacturing a battery tray includes an upper mold configured to press at least a part of the sheet from above the first plane to below the first plane and a lower mold configured to press at least a part of the sheet from below the first plane to above the first plane. It is possible to minimize a thickness of a product in a tray in which depths of battery accommodating grooves are large and to prevent incomplete molding from being generated.

11 Claims, 5 Drawing Sheets

MOLDING APPARATUS AND BATTERY TRAY MANUFACTURED THEREBY

RELATED APPLICATIONS

This application claims priority to and the benefit of Korean Patent Application No. 10-2014-0111569, filed on Aug. 26, 2014, in the Korean Intellectual Property Office, the entire contents of which are incorporated herein by reference in their entirety.

BACKGROUND OF THE INVENTION

Field of the Invention

The present invention relates to a molding apparatus for manufacturing a battery tray and a battery tray manufactured thereby.

Description of the Related Art

In general, unit parts that are completely assembled are contained in accommodating containers, are packed, and are forwarded.

Containers for accommodating batteries are divided into tube type containers and tray type containers. Recently, as batteries are made small and light, demands on the tray type containers are increasing.

A battery tray may be manufactured by an injection molding apparatus in consideration of a size and structure of a battery.

According to a conventional molding apparatus, it is difficult to obtain a uniform thickness of a tray and, in particular, incomplete molding are generated at bottom portions of battery accommodating grooves in a tray in which depths of the battery accommodating grooves are large.

SUMMARY OF THE INVENTION

An embodiment of the present invention relates to a molding apparatus capable of minimizing a thickness of a product in a tray in which depths of battery accommodating grooves are large and to prevent incomplete molding from being generated.

A molding apparatus for molding a sheet that is fed along a first plane and manufacturing a battery tray according to an embodiment of the present invention includes first mold for pressing at least a part of the sheet from one side of the first plane to a second side of the first plane and a second mold for pressing at least a part of the sheet from a second side of the first plane to a first side of the first plane.

The first mold may comprise an upper mold and the second mold may comprise a lower mold may include a plurality of convex portions and concave portions that protrude above and are recessed below a second plane parallel to the first plane.

The plurality of convex portions of the lower mold may rise above the first plane by heights thereof as the lower mold rises and may press at least a part of the sheet.

The upper mold may include a plurality of convex portions and concave portions that protrude below and are recessed above a third plane parallel to the first plane.

The plurality of convex portions of the upper mold may fall below the first plane by heights thereof as the upper mold falls and may press at least a part of the sheet.

Amounts by which the plurality of convex portions of the lower mold rise above the first plane may correspond to amounts by which the plurality of convex portions of the upper mold fall below the first plane.

The plurality of convex portions of the lower mold and the plurality of concave portions of the upper mold may be arranged to face each other and the plurality of convex portions of the lower mold may be inserted into the plurality of concave portions of the upper mold as the lower mold rises and the upper mold falls.

The plurality of convex portions of the lower mold and the plurality of concave portions of the upper mold may form bottom portions of a plurality of battery accommodating grooves provided in the battery tray.

The plurality of convex portions of the upper mold and the plurality of concave portions of the lower mold may be arranged to face each other and the plurality of convex portions of the upper mold may be inserted into the plurality of concave portions of the lower mold as the lower mold rises and the upper mold falls.

The plurality of convex portions of the upper mold may form a plurality of partitions provided in the battery tray to distinguish the plurality of battery accommodating grooves from each other.

At least one of the upper mold and the lower mold may include a plurality of holes for vacuum absorbing the sheet.

In addition, according to an embodiment of the present invention, there is provided a battery tray manufactured by the above molding apparatus.

According to the present invention, it is possible to minimize the thickness of the product in the tray in which the depths of the battery accommodating grooves are large and to prevent the incomplete molding from being generated.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
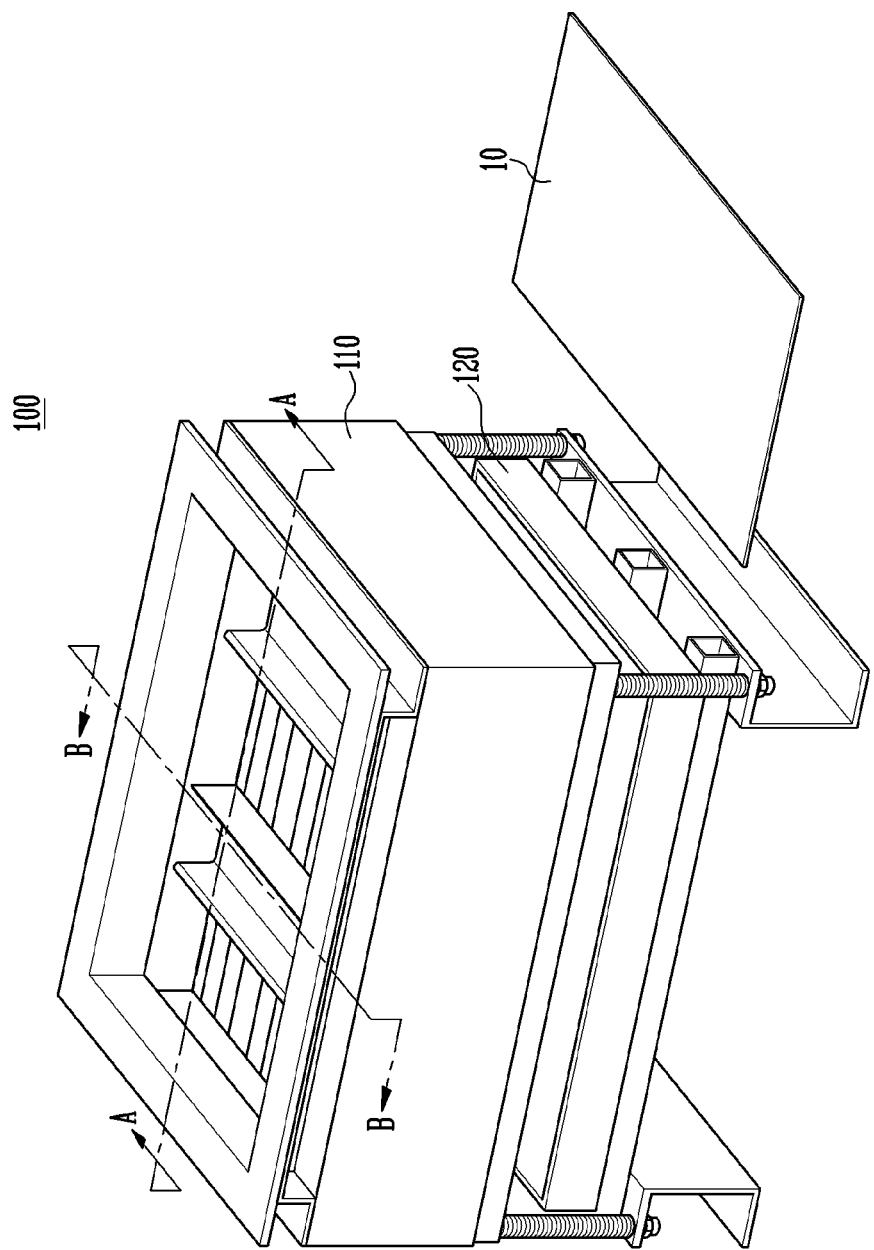
FIG. 1 is a perspective view illustrating a molding apparatus for manufacturing a battery tray according to an embodiment of the present invention.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will full convey the scope of the example embodiments to those skilled in the art. Like reference numerals refer to like elements throughout.

Hereinafter, embodiments of the present invention will be described in detail with reference to the accompanying drawings.

FIG. 1 is a perspective view illustrating a molding apparatus 100 for manufacturing a battery tray (hereinafter, for convenience sake, referred to as 'a molding apparatus') according to an embodiment of the present invention.

Figure 2:
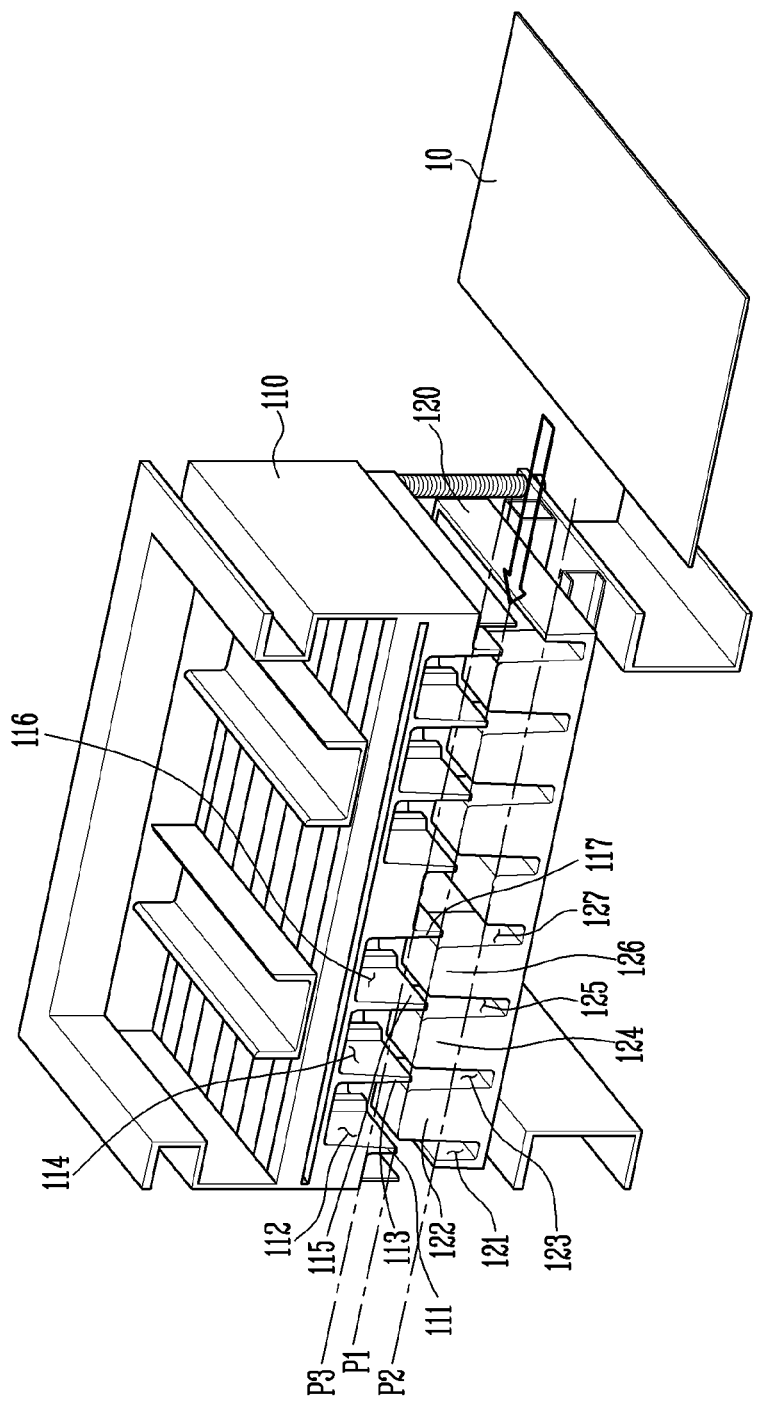
FIG. 2 is a perspective view of a cross-sectional view taken along the line AA of FIG. 1.
Figure 3:
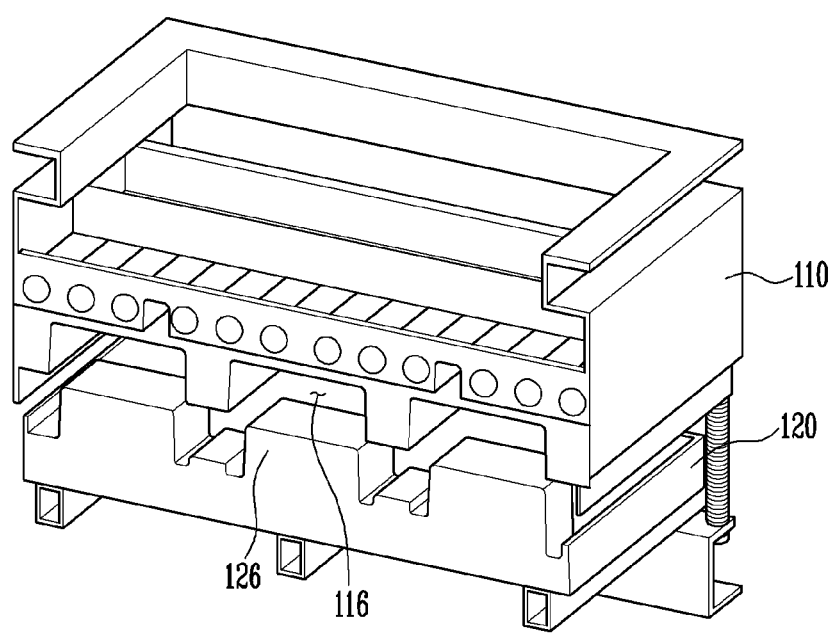
FIG. 3 is a perspective view of a cross-sectional view taken along the line BB of FIG. 1.

FIG. 2 is a perspective view of a cross-sectional view taken along the line AA of FIG. 1. FIG. 3 is a perspective view of a cross-sectional view taken along the line BB of FIG. 1.

Figure 4:
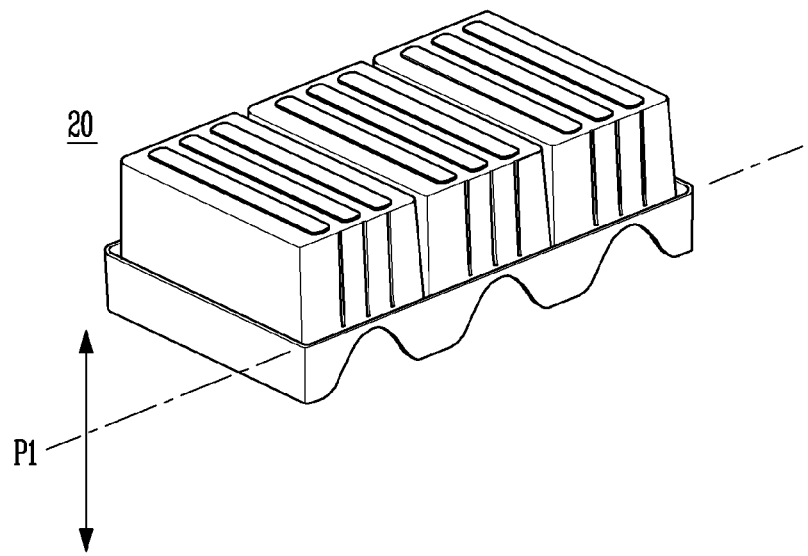
FIG. 4 is a perspective view illustrating a state in which a sheet that passes through the molding apparatus according to the embodiment of the present invention is transformed to a battery tray.
Figure 5:
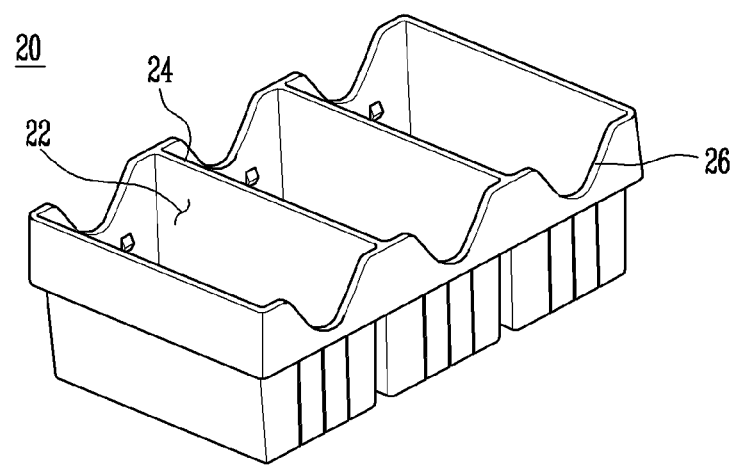
FIG. 5 is a perspective view illustrating a state in which the battery tray of FIG. 4 is put right for reference.

FIG. 4 is a perspective view illustrating a state in which a sheet that passes through the molding apparatus 100 according to the embodiment of the present invention is transformed to a battery tray 20. FIG. 5 is a perspective view illustrating a state in which the battery tray 20 of FIG. 4 is put right for reference.

As illustrated in FIGS. 1 to 5, the molding apparatus 100 according to the embodiment of the present invention molds a sheet 10 that is fed along a first plane P1 and forms the battery tray 20.

The sheet 10 may be press molded by the molding apparatus and may be formed of a material that may protect a battery against external shock. For example, the sheet 10 may be a polypropylene (PP) sheet. However, the present invention is not limited thereto.

The sheet 10 is continuously supplied to the molding apparatus 100 along the first plane P1 as illustrated in FIGS. 1 and 2.

The molding apparatus 100 that stands by in a molding position presses the sheet 10 from above and below the first plane P1 by an interaction of an upper mold 110 and a lower mold 120 and forms the battery tray 20 as described hereinafter.

The upper mold 110 and the lower mold 120 may be formed of aluminum (Al) but is not limited thereto.

Therefore, according to the present invention, even in the tray 20 in which depths of battery accommodating grooves 22 are large, it is possible to minimize a thickness of a product and to prevent incomplete molding from being generated.

The molding apparatus 100 according to the embodiment of the present invention may be applied to manufacturing a battery packing tray without limitation. In particular, since the molding apparatus 100 according to the embodiment of the present invention may be easily used for manufacturing a packing tray for packing a square type cell used for a portable terminal apparatus, hereinafter, an example in which the molding apparatus is applied to the square type cell packing tray will be described.

Hereinafter, a configuration of the molding apparatus 100 according to the embodiment of the present invention will be described in more detail with reference to FIGS. 2 to 5.

Referring to FIGS. 2 to 5, the molding apparatus 100 according to the embodiment of the present invention includes the upper mold 110 and the lower mold 120.

The upper mold 110 presses at least a part of the sheet 10 from above the first plane P1 to below the first plane P1.

The lower mold 120 presses at least a part of the sheet 10 from below the first plane P1 to above the first plane P1.

At this time, convex portions and concave portions are respectively formed in the molds 110 and 120 to go across so that a position in which the upper mold 110 presses the sheet 10 does not overlap a position in which the lower mold 120 presses the sheet 10. When the position in which the upper mold 110 presses the sheet 10 overlaps the position in which the lower mold 120 presses the sheet 10, the convex portions of the upper and lower molds 110 and 120 may collide with each other so that rising and falling operations of the upper and lower molds 110 and 120 may not be correctly performed and a required shape of the tray may not be obtained.

Shapes of the concave portions and the convex portions formed in the upper and lower molds will be described in detail. For convenience sake, the lower mold 120 will be described first.

The lower mold 120 according to the embodiment of the present invention includes a plurality of convex portions 122, 124, and 126 and concave portions 121, 123, 125, and 127 that protrude above and are recessed below a second plane P2 parallel to the first plane P1.

That is, in the lower mold 120, the plurality of convex portions 122, 124, and 126 may protrude above the second plane P2 and the plurality of concave portions 121, 123, 125, and 127 may be recessed below the second plane P2.

At this time, as illustrated in FIGS. 2 to 4, although all the elements are not denoted by reference numerals, since the molding apparatus 100 is for molding a number of (for example, six) trays at a time, the plurality of convex portions 122, 124, and 126 and the plurality of concave portions 121, 123, 125, and 127 may be repeated. That is, six sets of the plurality of convex portions 122, 124, and 126 and the plurality of concave portions 121, 123, 125, and 127 of the lower mold 120 may be formed so that six trays may be formed by pressing operations.

As the lower mold 120 of the above-described structure rises, the plurality of convex portions 122, 124, and 126 formed in the lower mold 120 also rise and press a part of the sheet 10.

At this time, the plurality of convex portions 122, 124, and 126 may rise above the first plane P1 by heights thereof in consideration of supplementary structures of the upper mold 110 and the lower mold 120 and a thickness of the sheet 10.

When the plurality of convex portions 122, 124, and 126 rise above the first plane P1 by amounts larger or smaller than the heights thereof, a height by which the upper mold 110 that faces the lower mold 120 falls should be reduced or increased so that the sheet 10 may be molded. As described above, when movement amounts of the upper and lower molds 110 and 120 are different from each other, an up and down deformation width of the sheet 10 may not be minimized. Therefore, in consideration of the supplementary structures of the upper mold 110 and the lower mold 120 and the thickness of the sheet 10, the plurality of convex portions 122, 124, and 126 may rise above the first plane P1 by the heights thereof. For example, the plurality of convex portions 122, 124 and 126 of the lower mold 120 rise to the third plane P3.

As the lower mold 120 rises, the plurality of concave portions 121, 123, 125, and 127 also rise and mold a part of the sheet 10 with the plurality of convex portions 111, 113, 115, and 117 of the upper mold 110 that is described hereinafter.

Next, the upper mold 110 according to the embodiment of the present invention includes the plurality of convex portions 111, 113, 115, and 117 and concave portions 112, 114, and 116 that protrude below and are recessed above a third plane P3 parallel to the first plane P1.

That is, in the upper mold 110, the plurality of convex portions 111, 113, 115, and 117 may protrude below the third plane P3 and the plurality of concave portions 112, 114, and 116 may be recessed above the third plane P3.

Since the second plane P2 of the above-described lower mold 120 runs parallel with the first plane P1, the upper mold 110 and the lower mold 120 run parallel with the plane P1 along which the sheet 10 is fed.

Although all the elements are not denoted by reference numerals in the upper mold 110, the plurality of convex portions 111, 113, 115, and 117 and the plurality of concave portions 112, 114, and 116 may be repeated. That is, six sets of the plurality of convex portions 111, 113, 115, and 117 and the plurality of concave portions 112, 114, and 116 of the upper mold 110 may be formed so that six trays may be formed by the pressing operations of the upper and lower molds 110 and 120.

As the lower mold 120 rises, the upper mold 110 falls. Therefore, the plurality of convex portions 111, 113, 115, and 117 formed in the upper mold 110 fall and press a part of the sheet 10.

At this time, the plurality of convex portions 111, 113, 115, and 117 may fall below the first plane P1 by heights thereof in consideration of the supplementary structures of the upper mold 110 and the lower mold 120 and the thickness of the sheet 10.

Like in the above-described lower mold 120, when the plurality of convex portions 111, 113, 115, and 117 of the upper mold 110 fall higher or lower than the heights thereof, a height by which the lower mold 120 that faces the upper mold 110 should be reduced or increased so that the sheet 10 may be molded. When movement amounts of the upper and lower molds 110 and 120 are different from each other, the up and down deformation width of the sheet 10 may not be minimized. Therefore, in consideration of the supplementary structures of the upper mold 110 and the lower mold 120 and the thickness of the sheet 10, the plurality of convex portions 111, 113, 115, and 117 may fall below the first plane P1 by the heights thereof. For example, the plurality of convex portions 111, 113, 115 and 117 of the upper mold 110 fall to the second plane P2.

As the upper mold 110 falls, the plurality of concave portions 112, 114, and 116 of the upper mold 110 also fall and mold a part of the sheet 10 with the plurality of convex portions 122, 124, and 126 of the lower mold 120 that is described above.

As a result, according to the embodiment of the present invention, an amount by which the plurality of convex portions 122, 124, and 126 of the lower mold 120 rise above the first plane P1 corresponds to (may be the same as) an amount by which the plurality of convex portions 111, 113, 115, and 117 of the upper mold 110 fall below the first plane P1. Therefore, it is possible to minimize the up and down deformation width of the sheet 10, to prevent the incomplete molding from being generated in the product, and to minimize the thickness of the product.

Hereinafter, referring to FIGS. 2 to 5, the sheet 10 formed by the supplementary structures of the upper and lower molds 110 and 120 will be described in detail.

First, as illustrated in FIGS. 2 and 3, the plurality of convex portions 122, 124, and 126 of the lower mold 120 and the plurality of concave portions 112, 114, and 116 of the upper mold 110 according to the embodiment of the present invention are arranged to face each other.

In accordance with the pressing operation of the molding apparatus 100, that is, as the lower mold 120 rises and the upper mold 110 falls, the plurality of convex portions 122, 124, and 126 of the lower mold 120 are inserted into the plurality of concave portions 112, 114, and 116 of the upper mold 110.

At this time, according to the embodiment of the present invention, the plurality of convex portions 122, 124, and 126 of the lower mold 120 are inserted into the plurality of concave portions 112, 114, and 116 of the upper mold 110 not by one of the rise of the lower mold 120 and the fall of the upper mold 110 as described above but by the interaction in which the lower mold 120 rises above the first plane P1 and the upper mold 110 falls below the first plane P1.

That is, the sheet 10 that is fed along the first plane P1 is not pressed in one direction but is simultaneously pressed from above and below the first plane P1.

In the same method, the plurality of convex portions 111, 113, 115, and 117 of the upper mold 110 and the plurality of concave portions 121, 123, 125, and 127 of the lower mold 120 according to the embodiment of the present invention are arranged to face each other.

In accordance with the pressing operation of the molding apparatus 100, the plurality of convex portions 111, 113, 115, and 117 of the upper mold 110 may be inserted into the plurality of concave portions 121, 123, 125, and 127 of the lower mold 120. At this time, according to the embodiment of the present invention, the plurality of convex portions 111, 113, 115, and 117 of the upper mold 110 are inserted into the plurality of concave portions 121, 123, 125, and 127 of the lower mold 120 not by one of the rise of the lower mold 120 and the fall of the upper mold 110 but by the interaction in which the lower mold 120 rises above the first plane P1 and the upper mold 110 falls below the first plane P1.

Therefore, according to the present invention, in molding the sheet 10 into the battery tray 20, the up and down deformation width of the sheet 10 may be minimized or reduced based on the first plane P1. As a result, it is possible to prevent or at least inhibit the incomplete molding from being generated at an upper or lower end of the battery tray and to minimize the thickness of the tray.

Continuously, as illustrated in FIG. 4, the sheet 10 that passes through the molding apparatus 100 according to the embodiment of the present invention is molded into the battery tray 20 and, immediately after passing through the molding apparatus 100, the sheet 10 has a shape in which the battery tray 20 is reversed. In FIG. 5, the battery tray 20 of FIG. 4 is put right.

At this time, bottom portions of the plurality of battery accommodating grooves 22 provided in the battery tray 20 are formed by the interaction between the plurality of convex portions 122, 124, and 126 of the lower mold 120 and the plurality of concave portions 112, 114, and 116 of the upper mold 110 according to the embodiment of the present invention.

A plurality of partitions 24 provided in the battery tray 20 are formed by the interaction between the plurality of convex portions 111, 113, 115, and 117 of the upper mold 110 and the plurality of concave portions 121, 123, 125, and 127 of the lower mold 120. At this time, the partitions 24 distinguish the battery accommodating grooves 22 from each other.

As described above, according to the embodiment of the present invention, unlike in the conventional art, the molds are upside down so that, immediately after passing through the molding apparatus 100, the sheet 10 has a shape in which a final product is reversed. In other words, the PP sheet 10 having flexibility immediately after being fed to the molding apparatus 100, may be stably mounted on upper faces of the plurality of convex portions 122, 124 and 126 of the lower mold 120 since the upper faces of the plurality of convex portions 122, 124 and 126 of the lower mold 120 are much wider than lower faces of the plurality of convex portions 111, 113, 115 and 117 of the upper mold 110 as shown in FIG. 2. Subsequently, as described above, the upper and lower molds 110 and 120 rising and falling on the basis of the PP sheet 10 by amounts corresponding to each other minimize the up and down deformation width of the PP sheet 10, so that it is possible to prevent incomplete molding of the bottom portions of the plurality of battery accommodating grooves 22 provided in the battery tray 20.

In addition, according to the embodiment of the present invention, the molding apparatus 100 may further include a hot wire (not shown) mounted on the molding apparatus 100 in order to effectively prevent the incomplete molding of the bottom portions of the battery accommodating grooves 22 from being generated. It is possible to uniformize a shape and strength of a product by the hot wire (not shown).

In addition, the molding apparatus 100 may include a cooling water line (not shown) mounted on the molding apparatus 100. The cooling water line (not shown) cools the sheet 10 when the molded sheet 10 is discharged from the molding apparatus 100 so that it is possible to reduce working processes and manufacturing cost.

FIG. 6 is a view illustrating the battery tray 20 manufactured by the molding apparatus 100 according to the embodiment of the present invention in comparison with a battery tray manufactured by a conventional molding apparatus.

Figure 6A:
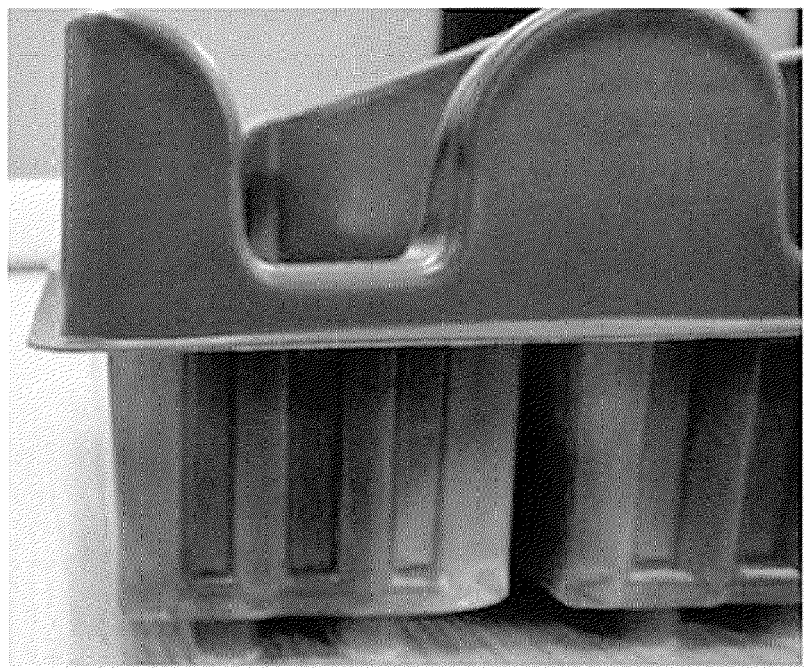
FIGS. 6A and 6B are views illustrating the battery tray manufactured by the molding apparatus according to the embodiment of the present invention in comparison with a battery tray manufactured by a conventional molding apparatus.

As illustrated in FIG. 6A, in a conventional battery tray, since a thickness of a product is reduced from an upper end toward a lower end, when a thickness of a sheet is small, the incomplete molding are generated at the lower end.

At this time, in order to prevent the incomplete molding from being generated, the thickness of the supplied sheet may be reduced, which may result in increase in manufacturing cost.

Figure 6B:
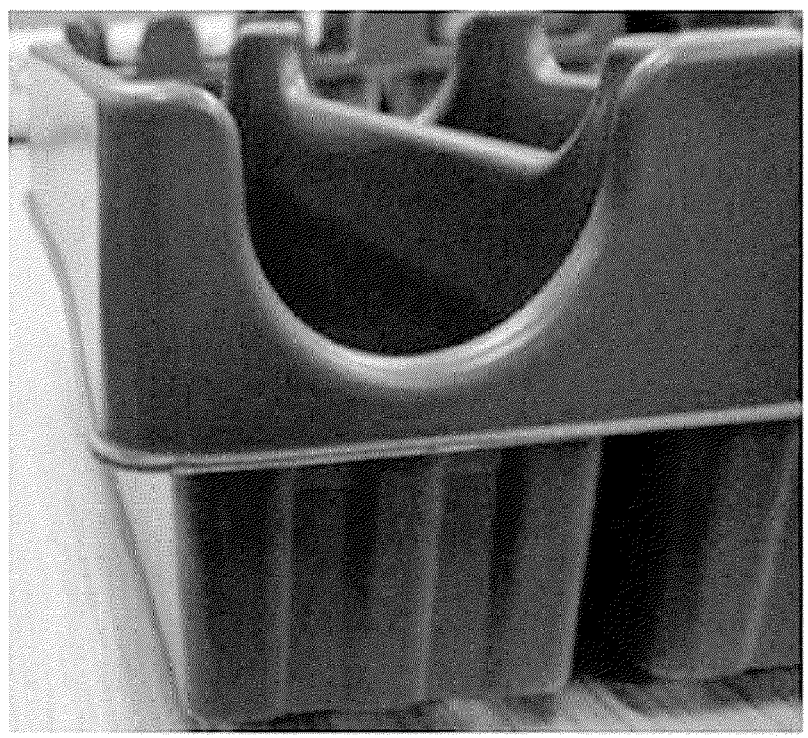

According to the present invention, as illustrated in FIG. 6B, it is possible to prevent the incomplete molding from being generated in the tray in which depths of the battery accommodating grooves are large and to minimize the thickness of the product.

On the other hand, as illustrated in FIGS. 4 to 6, semi-circular holding grooves 26 may be formed on side walls of the battery tray 20 manufactured by the molding apparatus 100 according to the embodiment of the present invention.

The semi-circular holding grooves 26 release stress applied to edges in a pressing process in comparison with conventional square holding grooves. Therefore, it is possible to prevent or reduce the molding apparatus 100 from being damaged.

In order to form the semi-circular holding grooves 26, wave-shaped concavo-convex portions may be formed on side surfaces of the plurality of convex portions and concave portions of the upper mold 110 of the molding apparatus 100 and wave-shaped concavo-convex portions may be formed on side surfaces of the plurality of convex portions and concave portions of the lower mold 120 of the molding apparatus 100.

In this case, the wave-shaped concavo-convex portions of the upper mold 110 and the wave-shaped concavo-convex portions of the lower mold 120 may be arranged to be engaged.

Although not shown in the drawings, according to the embodiment of the present invention, a plurality of holds (not shown) for vacuum absorbing the sheet 10 may be formed in at least one of the upper mold 110 and the lower mold 120.

For example, the plurality of holes (not shown) for vacuum absorbing the sheet 10 may be formed in the lower mold 120. The plurality of holes (not shown) have the sheet 10 adhere to the lower mold 120 with the pressing operations of the upper and lower molds 110 and 120 to uniformize molding quality of the product.

As described above, according to the present invention, it is possible to minimize or reduce the thickness of the product in the tray in which the depths of the battery accommodating grooves are large and to prevent the incomplete molding from being generated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A molding apparatus configured to mold a sheet that is fed along a first plane and to manufacture a battery tray, the molding apparatus comprising:
   a first mold configured to press at least a part of the sheet from a first side of the first plane to a second side of the first plane; and
   a second mold configured to press at least a part of the sheet from the second side of the first plane to the first side of the first plane,
   wherein the first mold comprises an upper mold and the second mold comprises a lower mold, wherein the lower mold comprises a plurality of convex portions and concave portions that protrude above and are recessed below a second plane parallel to the first plane.

2. The molding apparatus as claimed in claim 1, wherein the plurality of convex portions of the lower mold rise above the first plane by heights thereof as the lower mold rises and press at least a part of the sheet.

3. The molding apparatus as claimed in claim 2, wherein the upper mold comprises a plurality of convex portions and concave portions that protrude below and are recessed above a third plane parallel to the first plane.

4. The molding apparatus as claimed in claim 3, wherein the plurality of convex portions of the upper mold fall below the first plane by heights thereof as the upper mold falls and press at least a part of the sheet.

5. The molding apparatus as claimed in claim 4, wherein amounts by which the plurality of convex portions of the lower mold rise above the first plane correspond to amounts by which the plurality of convex portions of the upper mold fall below the first plane.

6. The molding apparatus as claimed in claim 4,
   wherein the plurality of convex portions of the lower mold and the plurality of concave portions of the upper mold are arranged to face each other, and wherein the plurality of convex portions of the lower mold are inserted into the plurality of concave portions of the upper mold as the lower mold rises and the upper mold falls.

7. The molding apparatus as claimed in claim 6, wherein the plurality of convex portions of the lower mold and the plurality of concave portions of the upper mold form bottom portions of a plurality of battery accommodating grooves provided in the battery tray.

8. The molding apparatus as claimed in claim 7,
wherein the plurality of convex portions of the upper mold and the plurality of concave portions of the lower mold are arranged to face each other, and
wherein the plurality of convex portions of the upper mold are inserted into the plurality of concave portions of the lower mold as the lower mold rises and the upper mold falls.

9. The molding apparatus as claimed in claim 8, wherein the plurality of convex portions of the upper mold form a plurality of partitions provided in the battery tray to distinguish the plurality of battery accommodating grooves from each other.

10. The molding apparatus as claimed in claim 1, wherein at least one of the first mold and the second mold comprises a plurality of holes configured to vacuum absorb the sheet.

11. A battery tray manufactured by the molding apparatus as claimed in claim 1.

\* \* \* \* \*